July 5, 1955   E. C. WAHL   2,712,459
HIGH SPEED SHAFT SEAL
Filed Sept. 27, 1950

INVENTOR:
EDWARD C. WAHL
BY
Rummler, Rummler & Snow
ATT'YS

United States Patent Office 2,712,459
Patented July 5, 1955

2,712,459

HIGH SPEED SHAFT SEAL

Edward C. Wahl, Arlington Heights, Ill., assignor to Gits Bros. Mfg. Co., Chicago, Ill., a corporation of Illinois Application September 27, 1950, Serial No. 186,987

6 Claims. (Cl. 286—11)

This invention relates to mechanical, face type, shaft seals and particularly to an improved axially acting acting shaft seal construction for application to high speed, high pressure operating conditions where it is required to seal a shaft opening against the passage of fluids.

The main objects of this invention are to provide an improved face type shaft seal construction; to provide an improved shaft seal unit, in cartridge form, for use under extreme conditions of speed and pressure; to provide such a device which will efficiently seal a rotating shaft and the shaft opening of a housing structure, in either axial direction, and regardless of the pressure differential at the two ends of the seal; to provide such a seal capable of self-adjustment to accommodate lateral and axial shaft movement; to provide an improved cartridge type of shaft seal having smaller dimensions relative to the shaft diameter; to provide such a shaft seal having a greater axial adjustability characteristic in proportion to its outside diameter; to provide an improved diaphragm and sealing ring construction for face type shaft seals; and to provide a high speed, high pressure cartridge type shaft seal that is simple in construction and highly economical in use.

Figure 1:
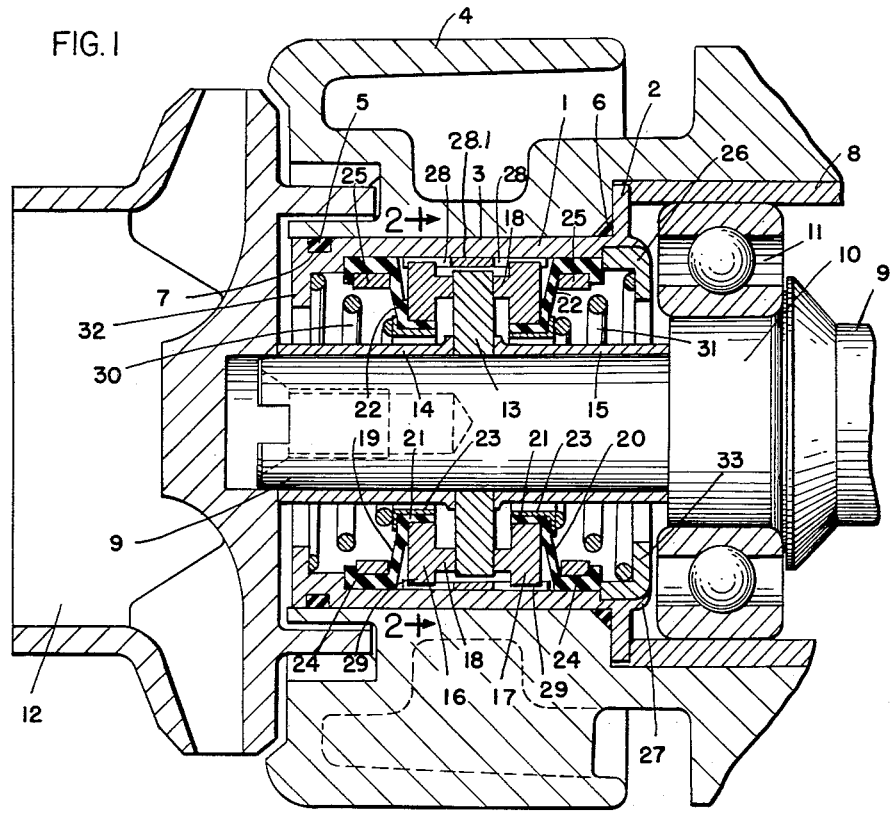
Figure 2:
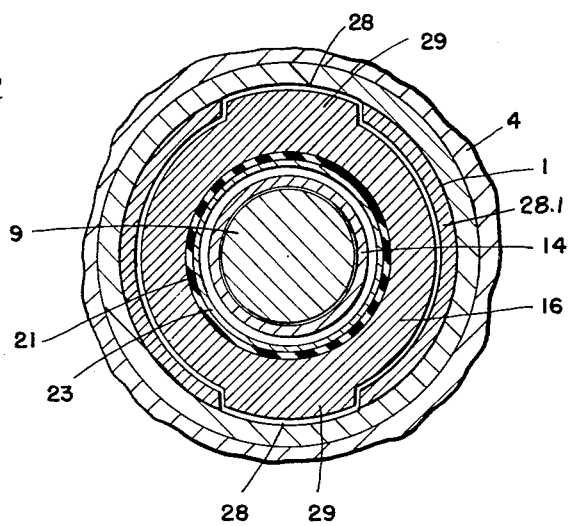

A specific embodiment of this invention is shown in the accompanying drawings in which:

Figure 1 is a sectional view in elevation showing the improved shaft seal installed in the shaft opening of a pump housing and illustrating the manner of its association with the shaft to be sealed, and Fig. 2 is a transverse sectional view, as taken on line 2—2 of Fig. 1, showing the manner in which the sealing ring is keyed to the cartridge housing to relieve the torsion on the diaphragm from which the sealing ring is supported.

In the form shown in the drawings the shaft seal unit is contained in a cylindrical cartridge housing 1 which is radially flanged at its rear or outer end, as at 2, and which is designed to be tightly fitted into the shaft opening 3 of the casing 4 of a pump, turbine, gear box, or the like. Suitable packing rings 5 and 6 are provided adjacent each end of the cartridge 1, on the peripheral wall thereof, to tightly seal the housing opening 3 against the passage of fluid along the wall of the cartridge, and these packing rings are made of resilient material designed for a compression fit. As shown the inner packing 5 is seated in a peripheral channel 7 in the cartridge body so that it will be readily carried into the shaft opening 3 when the cartridge is installed; and the outer package 6 is disposed in the corner formed by the end flange 2 and the cartridge wall where it will be engaged by the pump housing body at the outer end of the shaft opening 3.

The seal unit or assembly may be secured in the shaft opening 3 by any suitable means, such as the bushing 8 which bears endwise against the outer side of the flange 2, and the shaft 9 extends axially through the seal assembly. The shaft shown is provided with a hub 10 which in turn is supported on a suitable bearing 11, on the outer side of the seal, and the impeller 12 is overhung on the inner end of the shaft inside the housing 4. Thus, as shown, the seal is disposed about the shaft 9 between the impeller and the bearing hub.

The improved shaft seal cartridge is a permanent assembly, containing all of the component seal parts, and comprises a rotating portion, which turns with the shaft 9, and a stationary portion which remains fixed with the cartridge housing 1. The rotating portion comprises a disk-like ring 13, which has a central opening to freely receive the shaft 9, and a pair of tubular sleeves 14 and 15, one on each side of the ring 13, which telescope over the shaft. The rotating sealing ring 13 is clamped in proper running position on the shaft by means of the sleeves 14 and 15 which are designed to extend from the sealing ring, in both directions, to suitable shoulders fixed on the shaft and turning therewith. Thus, as shown, the sleeve 14 extends from the inner face of the ring 13 to the outer face of the impeller 12, and the sleeve 15 extends from the outer face of the ring 13 to the shoulder provided by the shaft hub 10, whereby, when the impeller is mounted on the shaft, after the shaft has been inserted through the seal assembly, the sealing ring 13 is firmly held by the sleeves, between the impeller and hub, so as to rotate directly with the shaft. It will be understood that any suitable means having leakproof connection with the shaft may be employed, other than the impeller and shaft hub, to accomplish the purpose of clamping the sleeves to the rotating ring 13 and the shaft; and that one of the functions of the clamping means is to obviate leakage of fluid along the surface of the shaft within the sleeves and the rotating ring 13.

The rotating seal ring 13 is lapped flat on both sides and the two sides are made parallel. Also the ends of the sleeves which abut the ring 13 are made square with the axis of the sleeves so that when the ring is clamped to the shaft its lapped faces will be normal to the shaft axis. Thus the faces of the ring 13 extend radially from the shaft, to almost the maximum inside diameter of the cartridge housing 1, and provide running surfaces against which a sliding leakproof sealing contact may be made by the stationary sealing elements.

The stationary portion of the improved unit seal comprises a pair of opposed non-rotating seal rings 16 and 17, disposed one on each side of the rotating ring 13, each of which has an axially extending projection, or nose portion 18. The ends of the nose portions 18 are also lapped to a substantially perfect flatness, in a plane normal to the ring axis, for engagement with the ring 13 to provide a leak proof sliding contact. The stationary rings 16 and 17 are, respectively, carried on the inner margins of flexible radial diaphragms 19 and 20 which diaphragms are secured at their outer margin to the inside surface of the cartridge housing 1.

In the form shown each diaphragm is provided with an axially extending collar 21 at its inner margin, which collar extends into and fits the central opening of the respective stationary sealing ring and a shoulder 22, normal to the axis of the collar, is provided at the juncture of the collar and the radial portion of the diaphragm. The sealing ring is seated in the corner formed by the shoulder 22 and the collar 21 and is firmly bonded thereto, by any suitable means. Also a flanged ferrule 23, of suitable material, is telescoped into the collar 21, from the opposite side of the diaphragm, and is therein expanded to compress the collar against the inner periphery of the sealing ring and further secure the ring and diaphragm together to provide a firm leakproof joint. The ferrule flange serves to protect the inner marginal edge of the diaphragm from the action of the compression springs which will be hereafter described.

Each of the diaphragms is also provided, at its outer margin, with a collar 24, which extends axially in the direction opposite the collar 21. This outer collar is formed to fit tightly against the inner wall surface of the cartridge housing 1, and is clamped thereto by an annular band 25, which is fitted within the collar and expanded radially, to assure ample contact between the flange and the cartridge wall to hold the diaphragm firmly in place and prevent any leakage of fluid at that location. As shown a radial shoulder is provided adjacent each end of the cartridge shell to further secure the diaphragm flange. At the inner end of the shell the shoulder is formed by a step in the wall of the shell, and at the opposite end the shoulder is formed by a closure ring 26 which is seated within the shell and secured by spinning, or otherwise turning inwardly, an axially extending flange or lip 27.

The stationary sealing rings 16 and 17 are relatively wide, in the radial direction, extending substantially to the inner wall of the cartridge shell 1, and, in the arrangement shown, the nose portions 18 are located near the outer margins of the stationary rings, as close as is practical to the outer margins of the rotary sealing ring faces. This permits control of the hydraulic balance of the seal sections and control of the pressure loading, per unit of area, between the nose rings and the rotating seal ring. Thus each side of the seal may be substantially in complete hydraulic balance, regardless of the fluid pressure encountered in the fluid to be sealed and regardless of the pressure conditions on the opposite side of the seal, or variation of the fluid pressures during operation. Also, if desired to have contact pressures that vary according to fluid pressure conditions, the nose portions 18 may be located close to the shaft in which case the seal sections would be out of hydraulic balance and the contact pressure would vary directly and proportionally as the fluid pressure changes.

In the form shown, oppositely extending keyways 28 are provided by means of slots formed endwise in the wall of a sleeve 28.1 press fitted into the housing 1 and adapted to slidably receive radial lugs 29 formed at diametrically opposite locations on the peripheries of the stationary rings 16 and 17. These lugs and keyways prevent the turning torque, applied to the stationary rings by virtue of their engagement with the rotating ring 13, from being transmitted to the diaphragms.

Normal contact pressure between the stationary sealing rings and the rotating sealing ring is provided by coiled compression springs 30 and 31 which bear against the flanges of the ferrules 23 at the inner margins of the diaphragms 19 and 20. The spring 30 is seated on a radial flange 32 formed integrally at the inner end of the cartridge shell 1; and the spring 31 seats against the radial flange portion 33 of the closure ring 26.

It will now be seen that the improved seal is assembled as a complete unit, containing all of the component seal parts except the sleeves 14 and 15, which are separate members ordinarily formed to lengths determined by the spacing between the clamping shoulders or elements on the shaft 9, and that all of the component seal parts when assembled are permanently secured by the closure ring 26. It will also be seen that, by securing the inner margin of the stationary sealing ring at the inner margin of the diaphragm, the flexing portion of the diaphragm is substantially coextensive with the width of the stationary sealing ring. This puts the pivot point, between the sealing ring and the diaphragm, as close as possible to the shaft and permits the inside diameter of the housing 1 to be only slightly greater than the diameter of the rotating sealing ring 13 without sacrifice of the maximum feasible range for axial diaphragm flexing, or movement, when in operation. The result is a materially smaller seal for any given capacity with a considerable saving in manufacturing cost.

The improved seal may be made from any suitable materials. Chosen according to the nature of the material to be sealed and according to the operating speeds, pressures and temperatures. Such materials are well known in the art and therefore need not be particularized here.

The main advantages of this invention reside in the improved seal structure which is particularly adapted to ultra-high speed operation, such as 30,000 to 40,000 R. P. M., and to high pressures and temperatures such as may be found in gas driven turbines and pumps; and in the high sealing efficiency that is obtained against either liquid or gas. Other advantages lie in adaptability of the improved construction to independent control of hydraulic balance on the two diaphragms and to control of the unit pressure loading on the sliding seal surfaces. And still further advantages are found in the short-radius pivot mounting of the stationary sealing rings on the diaphragms whereby over all seal dimensions may be greatly reduced without loss of operational efficiency.

Although but one specific embodiment of this invention is herein shown and described it will be understood that details of the construction shown may be altered or omitted without departing from the spirit of this invention as defined by the following claims.

I claim:

1. A face type cartridge unit shaft seal assembly comprising a hollow cylindrical housing, an annular disc-like rotatable sealing element of greater diameter than thickness having a central shaft receiving opening and parallel radial end faces extending substantially to the inner wall of said housing, said rotatable element being disposed centrally in said housing, a stationary radially extending disc-like sealing ring disposed on each side of said rotatable element in parallel relation therewith, each of said sealing rings having an axially extending nose portion located adjacent its outer margin and in sliding contact with the outer margin of the respective face of said rotatable element, a flexible radial diaphragm ring disposed adjacent each sealing ring in substantially parallel radially coextensive relation therewith on the side thereof opposite the respective nose portion, means securing the outer margin of each diaphragm in fluid tight relation against the inner wall of said housing, means securing the inner margin of each diaphragm to the inner periphery only of the adjacent sealing ring whereby the diaphragm is free to flex toward and away from substantially the entire adjacent face of the sealing ring, and means contained within said housing and acting on the inner marginal edge of each diaphragm for normally urging each sealing ring axially toward said rotatable sealing element.

2. A face type cartridge unit shaft seal assembly comprising a hollow cylindrical housing, an annular disc-like rotatable sealing element of greater diameter than thickness having a central shaft receiving opening and parallel radial end faces extending substantially to the inner wall of said housing, said rotatable element being disposed centrally in said housing, a stationary radially extending disc-like sealing ring disposed on each side of said rotatable element in parallel radially coextensive relation therewith, each of said sealing rings having a central opening of greater diameter than the shaft to be sealed and a relatively narrow axially extending nose portion located adjacent its outer margin and in sliding contact with the respective face of said rotatable element, a flexible radial diaphragm ring disposed adjacent each sealing ring in substantially parallel radially coextensive relation therewith on the side thereof opposite the respective nose portion, a collar on the outer edge of said diaphragm extending axially away from the respective sealing ring, means securing the collar of each diaphragm in fluid tight relation against the inner wall of said housing, a collar at the inner margin of each diaphragm ring extending axially into the central opening of the adjacent sealing ring and fixedly secured to the inner periphery only thereof, the radial portion of each diaphragm being axially movable relative to substantially the entire adjacent face of the respective sealing ring, and means acting on the inner edge of each diaphragm for normally urging each sealing ring axially toward said rotatable sealing element.

3. A face type cartridge unit shaft seal comprising a hollow cylindrical housing, an annular disc-like rotatable sealing element having a central shaft receiving opening and parallel radial end faces extending substantially to the inner wall of said housing, said rotatable element being disposed centrally in said housing, a stationary radially extending disc-like sealing ring disposed on each side of said rotatable element in parallel radially coextensive relation therewith, each of said sealing rings having a relatively narrow axially extending nose portion located adjacent its outer margin and in sliding contact with the respective face of said rotatable element adjacent the outer margin thereof, a flexible radial diaphragm ring disposed adjacent each sealing ring in substantially parallel radially coextensive relation therewith on the side thereof opposite the respective nose portion, a collar on the outer edge of said diaphragm extending axially away from the respective sealing ring, means securing the collar of each diaphragm in fluid tight relation with the inner wall of said housing, means for securing the inner margin of each diaphragm to the inner periphery only of the adjacent sealing ring whereby the diaphragm is free to flex toward and away from substantially the entire adjacent face of the sealing ring, means contained within said housing and acting on the inner edge of each diaphragm for normally urging each sealing ring axially toward said rotatable sealing element, a shaft extending axially through said housing, and means telescopingly fitted on said shaft and extending axially into said housing from each end thereof for securing said rotatable element in fluid tight driving relation with said shaft.

4. In a face type cartridge unit shaft seal comprising a cylindrical housing, a rotatable disk-like sealing element having a central shaft receiving opening and a radial end face, said sealing element extending radially to substantially the inner wall of said housing, a radially extending stationary sealing ring having substantially the same diameter as said sealing element and an annular axially projecting nose portion adjacent its outer margin in sliding contact with the radial end face of said rotatable element, and a flexible radial diaphragm ring on the opposite side of the stationary sealing ring and having its outer margin secured in fluid tight relation with the inner surface of said housing, said diaphragm ring being substantially coextensive radially with said stationary sealing ring and having an axially extending collar at its inner margin secured in fluid tight relation with the inner periphery only of the shaft opening in said stationary sealing ring.

5. In a face type cartridge unit shaft seal comprising a cylindrical housing, a rotatable disk-like sealing element having a central shaft receiving opening and a radial end face, said sealing element extending radially to substantially the inner wall of said housing, a radially extending stationary sealing ring having substantially the same diameter as said sealing element and an annular axially projecting nose portion in sliding contact with the radial end face of said rotatable element, and a flexible radial diaphragm ring on the opposite side of the stationary sealing ring and having a collar in its outer periphery extending axially away from said sealing ring and secured in fluid tight relation with the inner surface of said housing, said diaphragm ring being substantially coextensive radially with said stationary sealing ring and having an axially extending collar at its inner margin secured in fluid tight relation with the inner periphery only of the shaft opening in said stationary sealing ring, and said annular nose portion being disposed adjacent the outer margin of said stationary sealing ring and engaging the outer margin of the adjacent face of said sealing element.

6. In a face type cartridge unit shaft seal comprising a cylindrical housing, a rotatable disk-like sealing element having a central shaft receiving opening and a radial end face, said sealing element extending radially to substantially the inner wall of said housing, a radially extending stationary sealing ring having substantially the same diameter as said sealing element and an annular axially projecting nose portion spaced radially from its inner margin and in sliding contact with the radial end face of said rotatable element, and a flexible radial diaphragm ring on the opposite side of the stationary sealing ring having a collar at its outer margin extending axially away from said sealing ring and secured in fluid tight relation with the inner surface of said housing, said diaphragm ring being substantially coextensive radially with said stationary sealing ring and having an annular collar at its inner margin extending axially into said stationary sealing ring and peripherally secured thereto, whereby the diaphragm is free to flex toward and away from substantially the entire radial surface of the sealing ring.

References Cited in the file of this patent

UNITED STATES PATENTS

| 2,308,114 | Schjalin | Jan. 12, 1943 |
| 2,362,363 | Doede | Nov. 7, 1944 |
| 2,444,713 | Solari | July 6, 1948 |
| 2,445,018 | Brady | July 13, 1948 |
| 2,465,499 | Voytech | Mar. 29, 1949 |
| 2,538,987 | Synek | Jan. 23, 1951 |

FOREIGN PATENTS

| 924,833 | France | Mar. 17, 1947 |